United States Patent [19]

Kent

[11] Patent Number: 5,179,705

[45] Date of Patent: Jan. 12, 1993

[54] ASYNCHRONOUS ARBITER STATE MACHINE FOR ARBITRATING BETWEEN OPERATING DEVICES REQUESTING ACCESS TO A SHARED RESOURCE

[75] Inventor: Osman Kent, Kingston-Upon-Thames Surrey, United Kingdom

[73] Assignee: DuPont Pixel Systems, Ltd., Weybridge, United Kingdom

[21] Appl. No.: 793,306

[22] Filed: Nov. 14, 1991

Related U.S. Application Data

[63] Continuation of Ser. No. 593,295, Oct. 4, 1990, abandoned, which is a continuation of Ser. No. 327,448, Mar. 22, 1989, abandoned.

[30] Foreign Application Priority Data

Mar. 23, 1988 [GB] United Kingdom ............... 8806836

[51] Int. Cl.⁵ ............... G06F 13/364; G06F 13/16
[52] U.S. Cl. ............... 395/725; 395/325; 395/425; 340/825.5; 364/DIG. 1; 364/228.1; 364/240.1; 364/242.6; 364/242.7; 364/242.91; 364/242.92
[58] Field of Search ............... 395/725, 325, 425; 340/825.5

[56] References Cited

U.S. PATENT DOCUMENTS

| | | | |
|---|---|---|---|
| 4,016,539 | 4/1977 | Nanya | 340/825.5 |
| 4,251,861 | 2/1981 | Mago | 364/200 |
| 4,270,169 | 5/1981 | Hunt et al. | 364/200 |
| 4,270,170 | 5/1981 | Reddaway | 364/200 |
| 4,314,349 | 2/1982 | Batcher | 364/716 |
| 4,344,134 | 8/1982 | Barnes | 364/200 |
| 4,390,969 | 6/1983 | Hayes | 364/900 |
| 4,412,303 | 10/1983 | Barnes et al. | 364/900 |
| 4,423,384 | 12/1983 | De Bock | 340/825.51 |
| 4,445,177 | 4/1984 | Bratt et al. | 364/200 |
| 4,455,602 | 6/1984 | Baxter, III et al. | 364/200 |
| 4,467,422 | 8/1984 | Hunt | 364/200 |
| 4,468,727 | 8/1984 | Carrison et al. | 364/200 |
| 4,473,880 | 9/1984 | Budde et al. | 364/200 |
| 4,480,307 | 10/1984 | Budde et al. | 364/200 |
| 4,491,916 | 1/1985 | Vallhonrat | 364/200 |
| 4,493,048 | 1/1985 | Kung et al. | 364/754 |
| 4,499,538 | 2/1985 | Finger et al. | 395/325 |
| 4,514,807 | 4/1985 | Nogi | 364/200 |
| 4,546,428 | 10/1985 | Morton | 364/200 |
| 4,562,427 | 12/1985 | Ecton | 340/825.5 |
| 4,578,782 | 3/1986 | Kraft et al. | 395/425 |
| 4,586,128 | 4/1986 | De Woskin | 395/725 |
| 4,589,067 | 5/1986 | Porter et al. | 364/200 |
| 4,633,434 | 12/1986 | Scheuneman | 364/900 |
| 4,701,756 | 10/1987 | Burr | 340/825.02 |
| 4,740,891 | 4/1988 | Kirkpatrick | 364/200 |
| 4,779,089 | 10/1988 | Theus | 364/200 |
| 4,841,178 | 6/1989 | Bisson | 395/725 |
| 4,851,996 | 7/1989 | Boioli et al. | 395/550 |
| 4,881,195 | 11/1989 | De Long et al. | 395/725 |
| 4,964,034 | 10/1990 | Jaskowiak | 395/325 |

OTHER PUBLICATIONS

Roth, Jr., C. H., *Fundamentals of Logic Design*, pp. 427–430 (3rd Ed. 1985).

*Primary Examiner*—David L. Clark
*Assistant Examiner*—Matthew C. Fagan
*Attorney, Agent, or Firm*—Sterne, Kessler, Goldstein & Fox

[57] ABSTRACT

A system has a shared resource, such as a bus or memory, with which various devices may communicate upon a request being granted by an arbiter. In order to reduce the arbitration time, the arbiter is comprised of a state machine and latch which run asynchronously. Consequently, once one request has been granted and acted upon, the state machine will commence arbitration for any remaining requests.

9 Claims, 6 Drawing Sheets

ASYNCHRONOUS ARBITER STATE MACHINE FOR ARBITRATING BETWEEN OPERATING DEVICES REQUESTING ACCESS TO A SHARED RESOURCE

This application is a continuation of application Ser. No. 07/593,295, filed Oct. 4, 1990, now abandoned, which is a continuation of application Ser. No. 07/327,448, filed Mar. 22, 1989, now abandoned.

FIELD OF THE INVENTION

This invention relates to an arbitration system.

In order that a plurality of different portions of a computer system may share a common resource, such as a common bus or a common memory, it is necessary to provide an arbitration system so that only one portion uses the resource at a given time.

Arbitration problems arise not only as between processors or processes in computer systems, but also in a wide variety of other electronic systems. For example, arbitration needs commonly arise in communications networks, where interface access and gateway access can be important shared resources.

BACKGROUND TO THE INVENTION

In a known bus arbitration scheme, at one system clock cycle the bus requests which are current are loaded into a register, and at the next system clock cycle the requests held in the register are arbitrated by a state machine to determine which request to grant. The register is necessary to overcome metastability problems; without the register if a request were to change at the time of arbitration, an incorrect grant, or "glitch" is likely to arise.

A problem with the arbitration system described above concerns the speed of arbitration. If a request is made immediately after a clock cycle begins, it will not be loaded into the register until just under one clock cycle later, and it will not be arbitrated until the next clock cycle. Thus, if the system clock has a frequency of 50 MHz, it can take up to 40 ns before a request is arbitrated. There is a desire to shorten the arbitration period to 20 ns, or less. However, increasing the system clock frequency above 50 MHz, for example to 100 MHz, presents practical problems with present technology.

SUMMARY OF THE INVENTION

The present invention provides an arbitration system which does not need to wait for an external clock signal before commencing an arbitration operation and which can commence a subsequent arbitration operation immediately after a preceding request has been satisfied.

The invention provides an arbitration system having latch means with a plurality of signal inputs, a corresponding plurality of signal outputs and a control input. Each signal input receives a respective one of the resource request signals. The control input receives a control signal. Each signal output provides a respective second resource signal which is selectably a latched form and a passed form of the respective first-mentioned resource request signal in dependence on the control signal. Furthermore, the system includes an asynchronous state machine having a plurality of inputs and outputs. Each input receives a respective one of the first and second resource request signals; each output is provided for a respective one of the first resource request signals and its corresponding second resource request signal. Each output provides a respective one of the grant signals to a respective one of the operating means.

A control output provides the control signal to the latch means. The state machine operates cyclicly and asynchronously (a) to set the control signal in response to one or more of the resource request signals so that the latching means latches the first resource request signals to provide the second resource signals; (b) to arbitrate between the second resource request signals to select one of the second resource request signals corresponding to a selected one of the operating means; (c) to provide that one of the grant signals corresponding to the selected one of the operating means; (d) to wait until the first resource request signal for the selected one of the operating means ceases to request the resource; and (e) to set the control signal so that the latching means passes the first resource request signals to form the second resource request signals.

Therefore, in accordance with the invention, an initial arbitration operation can commence immediately upon a first resource request signal arising, glitches are prevented due to the action of the latching means which prevents any second resource request signal changing during an arbitration operation, and subsequent arbitration operations can commence immediately after a preceding request has been satisfied, as signalled by the appropriate first resource request signal.

FEATURES OF THE INVENTION

In accordance with one aspect of the present invention, the arbitration system is operated asynchronously. Put in other words, once an arbitration operation has been completed, the system does not wait to be triggered by an external signal (such as a computer system clock) before commencing the next arbitration operation.

In accordance with another aspect of the invention, there is provided a system having a common resource, a plurality of means each operable to provide a resource request signal and to communicate with the resource in response to a grant signal, and arbitration means which is responsive to the resource request signals and is operable repeatedly to determine which request to grant and provide a corresponding grant signal, characterised in that the arbitration means operates asynchronously with respect to any external signal.

In accordance with a further aspect of the invention, there is provided a system having a common resource, a plurality of means each operable to provide a resource request signal and to communicate with the resource in response to a grant signal, and arbitration means which is responsive to the resource request signals and is operable repeatedly to perform an arbitration operation to determine which request to grant and provide a corresponding grant signal, characterised in that the arbitration means is operable to commence a succeeding arbitration operation in response to one or more resource request signals immediately after completion of the preceding arbitration operation.

Thus, the systems according to the various aspects of the invention have the advantage that the arbitration period is determined solely by the propagation delays of the system and is independent of any system clock frequency or the timing of the request signals relative to the system clock.

Preferably, the arbitration means includes a state machine, which may be operable to change state cyclicly:

from an initial state to a decision state in response to one or more request signals;

from the decision state to one of a plurality of grant states determined in the decision state from the current request signals; and from the determined grant state back to the initial state once the determined request has been met.

Conventionally, the state machine has a plural bit state variable which has different values in each of the states, and in order to prevent glitches due to the asynchronous operation of the state machine the correlation between the bit values of the state variable and the states is preferably arranged such that upon a change from any state to a succeeding state only one of the bit values changes. Preferably, the bits of the state variable are allocated such that each grant signal can be determined from the value of a respective one of the bits of the state variable, thus obviating the need for further logic in order to produce the grant signals. With such a bit allocation of the state variable, it may be required that the state machine is operable to change from at least one of the states to at least one other of the states via a transient state.

In order to prevent glitches, the system preferably further comprises means to prevent a change in a request signal input to the state machine while the state machine is in the decision state. Such means may comprise a latch which is operable to pass the request signals when the state machine is in the initial state and which is operable to latch the request signals when the state machine is in the decision state. Conveniently, the state machine and the means to prevent a change are formed by a single programmable logic array.

In order to determine when a grant signal has been acted upon, the state machine may be arranged to be responsive directly to the request signals and be operable to remain in a determined grant state until the respective request signal is removed.

In one embodiment, the common resource is a bus of the computer system. In another embodiment, the common resource is a memory of the computer system. By adopting the arbitration system according to the invention, it is envisaged that it will be possible to use relatively inexpensive multi-ported dRAM memories, where otherwise it would be necessary to use more expensive sRAM memories.

DESCRIPTION OF THE EMBODIMENTS

Figure 1:
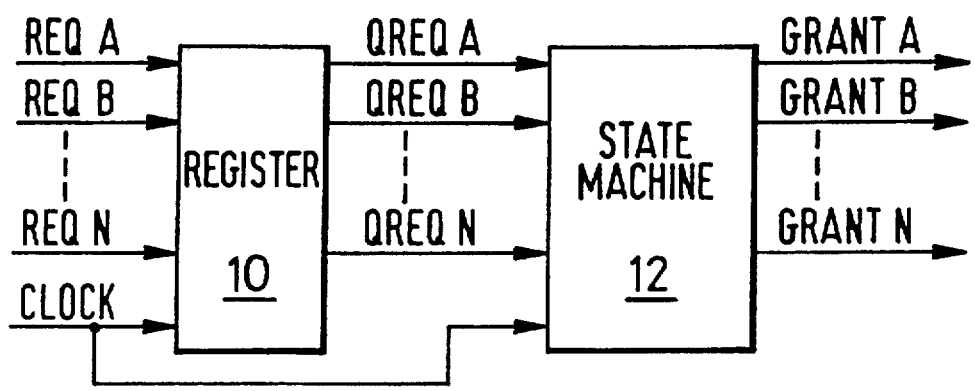
FIG. 1 is an electrical diagram illustrating a known arbitration system.

Referring to FIG. 1, in a known system, a plurality of bus request signals REQA to REQN are fed to a register 10, which loads the signals in response to a system clock signal. The content of the register 10 QREQA to QREQN is read by a state machine 12 also in response to a system clock signal, and the state machine 12 makes a decision as to which request to grant and provides a corresponding output GRANTA to GRANTN.

Figure 2:
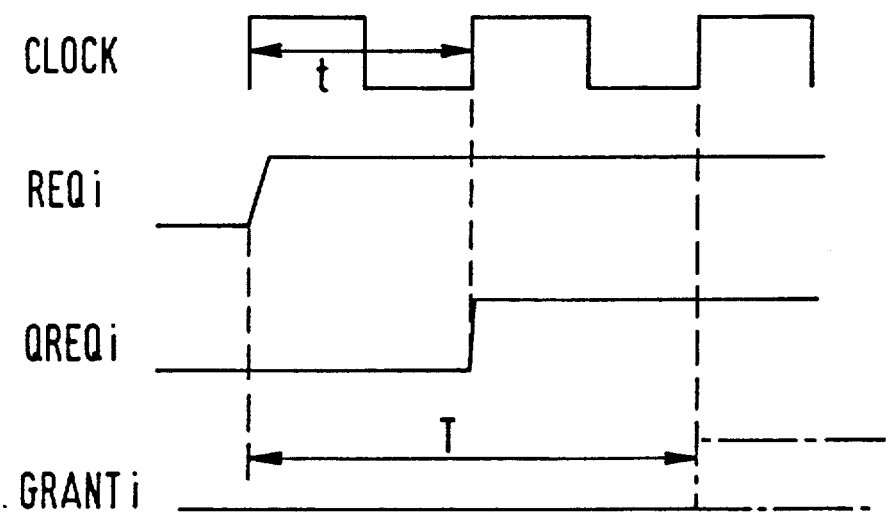
FIG. 2 shows example waveforms in the arrangement of FIG. 1.

Referring to FIG. 2, if a bus request signal REQi changes immediately after the rising edge of the clock, the new value of the signal REQi is not loaded in the register until the next rising edge of the clock signal. The state machine 12 does not act upon the corresponding change in the signal QREQi held in the register 10 to provide (or not) a change in signal GRANTi until the rising edge of the next succeeding clock signal. Therefore, as can be seen from FIG. 2, a delay T approaching twice the system clock period t can arise between a bus request being made and the state machine taking the request into consideration.

Figure 3:
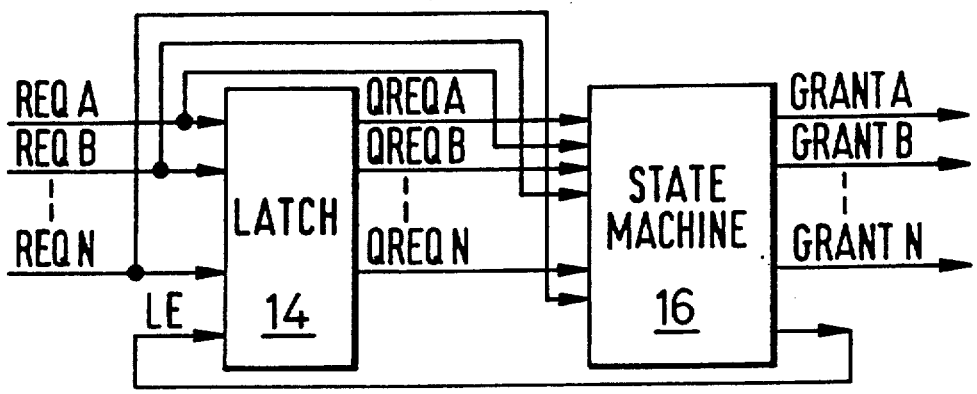
FIG. 3 is an electrical diagram illustrating an embodiment of bus arbitration system according to the invention.

FIG. 3 is an electrical diagram representing one embodiment of the invention. The bus request signals REQA to REQN are fed to a latch 14. The latch is enabled by an LE signal provided from a state machine 16. The outputs of the latch 14 QREQA to QREQN are fed to the state machine 16, as too are the bus request signals REQA to REQN. The state machine 16 makes a decision as to which request to grant, and a corresponding output GRANTA to GRANTN is provided.

Figure 4:
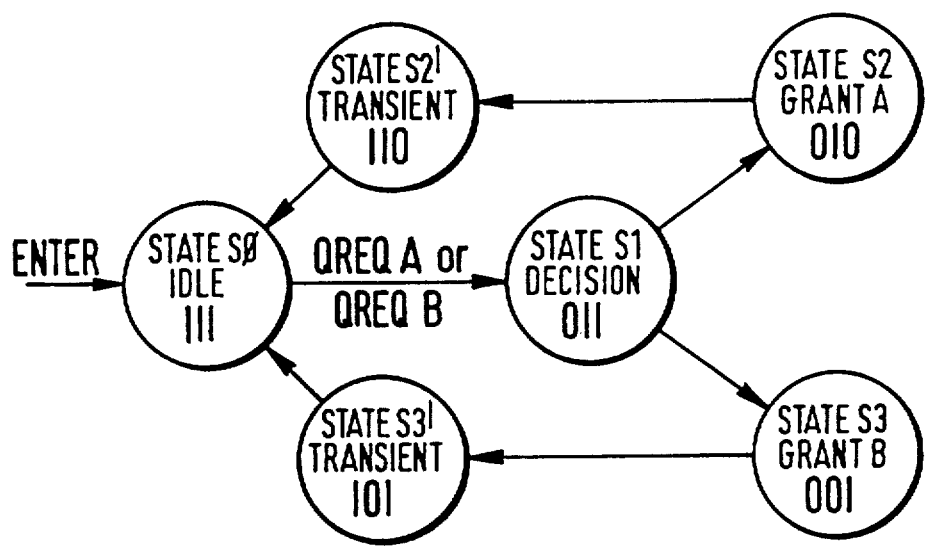
FIG. 4 is a state diagram for a simplified version of the FIG. 3 embodiment.

The state diagram of the arrangement of FIG. 3 is shown in FIG. 4. The state machine is initially in State S0 and the latch enable signal LE is such that the bus request signals REQi are passed through the latch, that is QREQi=REQi. In response to one or more bus request signals, the state machine changes to State S1 and the latch enable signal LE is changed so that the latch latches the bus request signals. In State S1, the state machine makes a decision, in known manner, as to which bus request to grant. In the example of FIG. 4, only two bus requests REQA and REQB are shown, for the sake of simplicity. In accordance with the decision, the state machine changes to State S2 or State S3 indicating GRANTA or GRANTB. The state machine remains in State S2 or S3 until the signal REQA or REQB, respectively, changes, indicating that the request has been met. The state machine then changes to State S0 (via transient State S2' or S3' to be described below) and the latch enable signal is changed so that further bus requests can pass to the state machine. Thus, the system is asynchronous and will commence a subsequent arbitration operation, if required, immediately after a preceding arbitration operation has been completed.

In summary, the definitions of the states and latch enable signal are as follows:

| State S0: | if QREQA or QREQB |
| (idle) | then State S1 |

|              |                             |
| ------------ | --------------------------- |
|              | else State S0               |
| State S1:    | case                        |
| (decision)   | QREQA: State S2             |
|              | QREQB: State S3             |
| State S2:    | if REQA                     |
| (grant A)    | then State S2               |
|              | else State S0 (via State S2') |
| State S3:    | if REQB                     |
| (grant B)    | then State S3               |
|              | else State S0 (via State S3') |
| LE =         | (current state = State S0)  |

Disregarding the transient states S2' and S3', the simple version of state machine described above has only four states, and it could therefore be considered that a state variable needs only two bits in order to define the state of the machine. For example, bits Y1 and Y0 of such a state variable could identify the states as follows:

| State | Y1 | Y0 |
| ----- | -- | -- |
| S0    | 1  | 1  |
| S1    | 1  | 0  |
| S2    | 0  | 0  |
| S3    | 0  | 1  |

Figure 5:
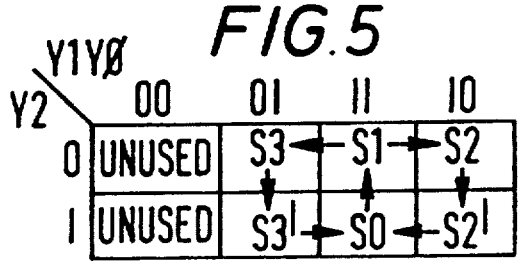
FIG. 5 is a table showing the relationship between the state variables and the states in the FIG. 4 diagram.

However, representing the state variable as only two bits has a drawback in an asynchronous system in that, upon a change from State S1 to State S3, and also upon a change from State S2 to S0, it is necessary for both bits Y0 and Y1 to change. This is therefore likely to produce a glitch because upon an intended change from State S1 to S3, for example, if bit Y1 changes from "1" to "0" before bit Y0 changes from "0" to "1", the state machine will assume state S2 (Y1="0", Y0="0"), rather than state S3. In order to overcome this problem, the state variable has more bits than the minimum necessary and transient states are employed. In the simple version of state machine described above, the state variable has three bits, and two transient States S2' and S3' are employed. As shown in FIGS. 4 and 5, the three bits Y2, Y1 and Y0 identify the states as follows:

| State | Y2 | Y1 | Y0 |
| ----- | -- | -- | -- |
| S0    | 1  | 1  | 1  |
| S1    | 0  | 1  | 1  |
| S2    | 0  | 1  | 0  |
| S2'   | 1  | 1  | 0  |
| S3    | 0  | 0  | 1  |
| S3'   | 1  | 0  | 1  |

It will be noted, therefore, and especially from FIG. 5, that only one bit of the state variable changes upon a change of state, and thus glitches will not occur.

A further advantage of employing more bits in the state variable than the minimum necessary to define all the states is that the GRANT signals are directly derivable from respective bits of the state variable. In the example given above, the GRANTA signal is the complement of bit Y0, and the GRANTB signal is the complement of bit Y1. Thus, there is no need for further logic in order to produce the grant signals.

The transient states S2' and S3' may be assumed before, rather than after, the respective grant states S2 and S3. However, it is preferred that the transient states follow their respective grant states, so that the grant states are assumed at the earliest possible time, it being of lesser importance to return quickly to the initial state S0 once the grant state has been attained.

The latch enable signal may be formed from the output of a 3-input inverting OR gate, each of the inputs of which is provided by a respective one of the state variable bits Y0, Y1 and Y2. Alternatively, the state variable may have a further bit Y3 which is set to a value of "1" only in the idle state S0, and the latch enable signal LE can then be directly taken from the value of the bit Y3.

With the system described above, the arbitration period is determined solely by the propagation delays of the apparatus and is independent of the period of the system clock or the timing of the bus request signals relative to the system clock. It is envisaged that an arbitration period of 20 ns may be achieved using current technology, which compares favourably with an arbitration period of 40 ns using the above described known arbitration system and a system clock of 50 MHz frequency.

The arbitration system described above may be used for other applications, in addition to bus arbitration. For example, referring to FIG. 6, a four-port dRAM 18 has its ports connected to an applications processor 20, an input/output processor 22, a VME bus 24 and a refresh control 26, respectively. Each of these elements can provide a respective memory request signal APREQ, IOREQ, VMEREQ and REFREQ to a RAM arbiter 28 including a latch and a state machine operating asynchronously in a manner similar to that of the bus arbiter described with reference to FIGS. 3 to 5. The result of the arbitration operation is provided as four signals APGRANT, IOGRANT, VMEGRANT and REFGRANT to control the communication with the dRAM 18.

Figure 6:
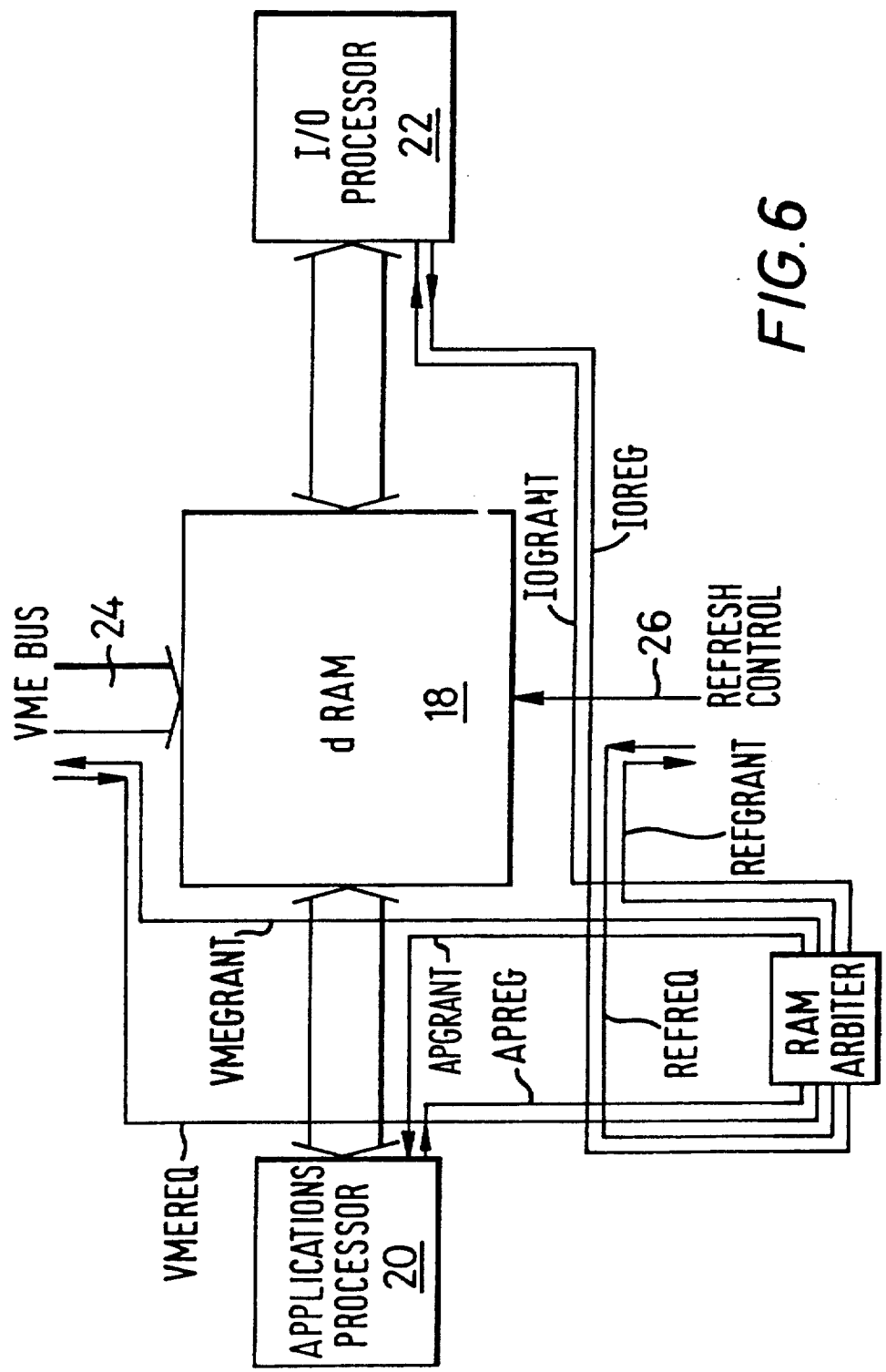
FIG. 6 is an electrical diagram illustrating an embodiment of RAM arbitration system according to the invention.
Figure 7:
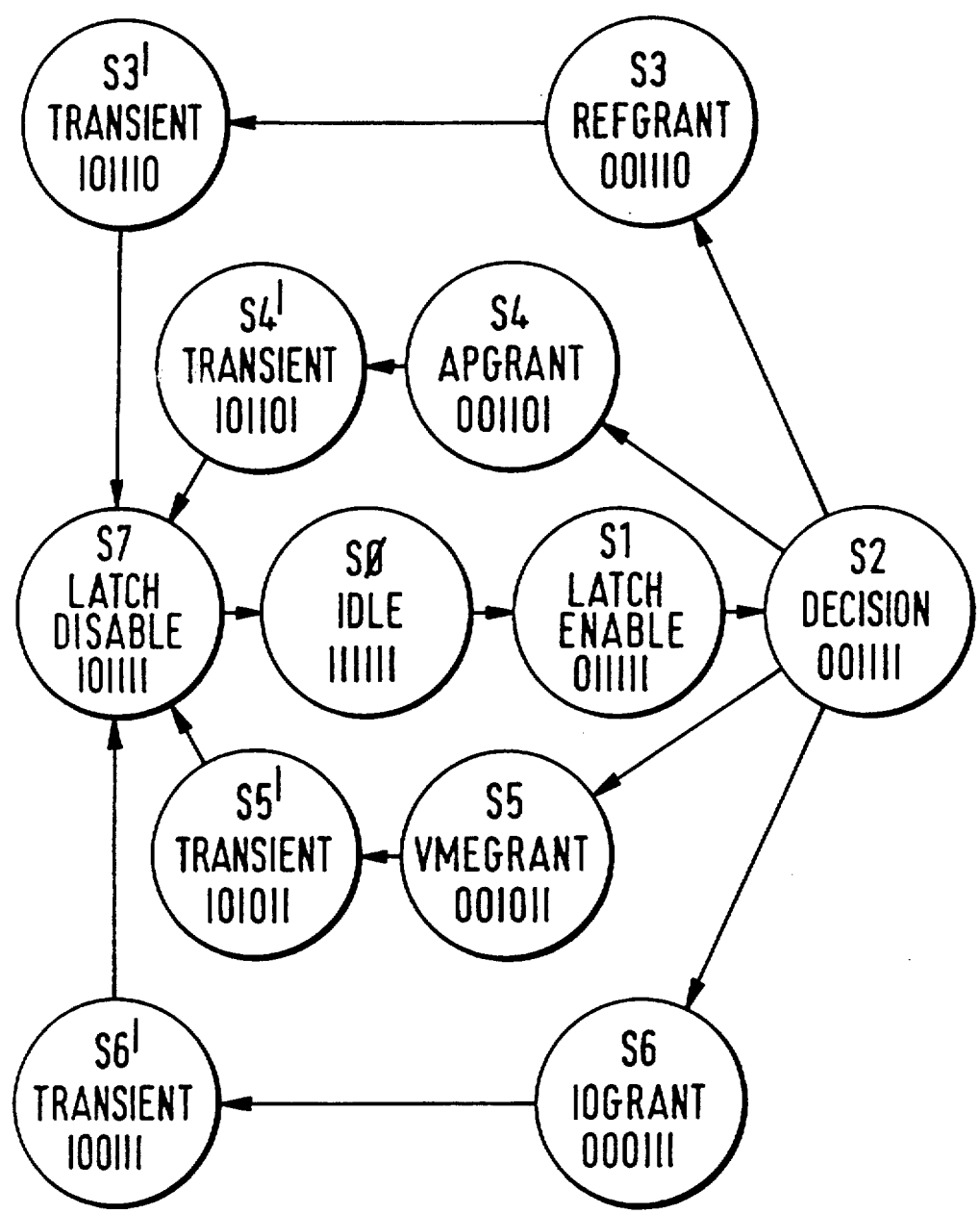
FIG. 7 is a state diagram for the RAM arbiter of FIG. 6.

Referring to FIG. 7, the state diagram for the RAM arbiter of FIG. 6 is similar to that of FIG. 4, with the exceptions that (a) there are four grant states, S3 to S6, with corresponding transient states, S3' to S6', (b) there is a latch enable state, S1, immediately after the idle state, (c) there is a latch disable state, S7, immediately after each of the transient states, S3' to S6', and (d) the state variable has six bits. As before, it will be noted that only one bit of the state variable changes from one state to the next. It will be noted that the grant signals REFGRANT, APGRANT, VMEGRANT and IOGRANT are determinable directly from the values of bits Y0 to Y3, respectively, of the state variable. Furthermore, it will be noted that the latch enable signal is determinable from bit Y4, which has the value "1" only in states S0 and S1.

Figure 8:
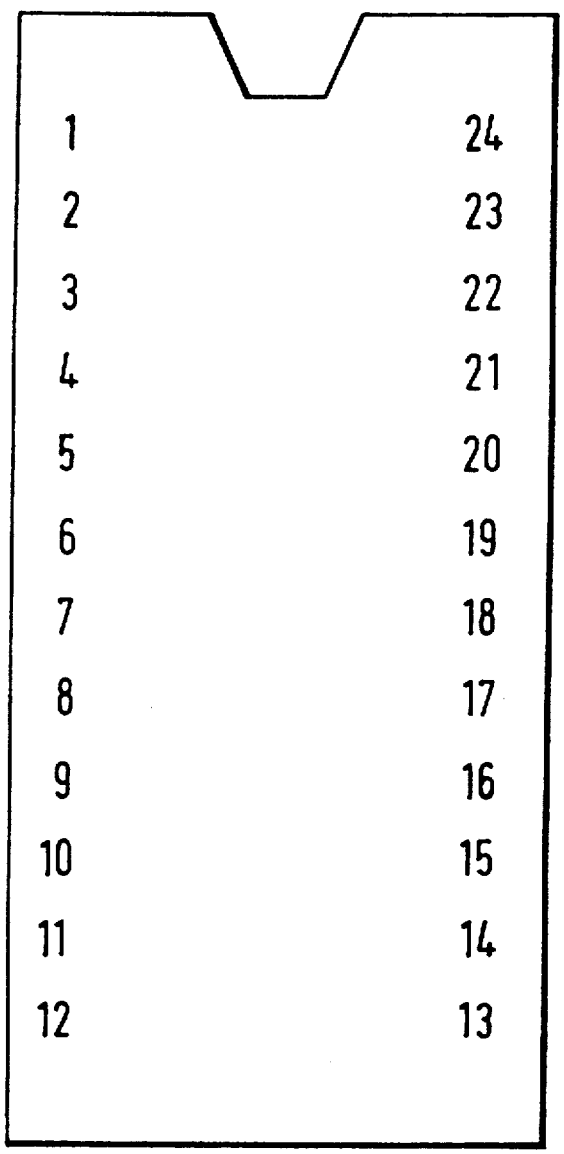
FIG. 8 is a pinout diagram for the RAM arbiter of FIG. 6.

FIG. 8 is a pinout diagram for the RAM arbiter of FIG. 6, and the attached appendix, produced using the logic design tool ABEL, provides the input and output definitions, the state assignment definitions, the latch output equations, the state diagram equations, and a set of reduced equations from which, if desired, the arbiter could be constructed using basic logic devices (i.e. AND gates, OR gates and inverters or implemented in a programmable logic array.

It will be noted from the equation for state S2 that a request QREFREQ from the refresh control is given first priority, and that the other requests QAPREQ, QVMEREQ and QIOREQ are given reduced priority in that order.

The above disclosed architecture can be applied in a very wide variety of contexts. In particular, asynchronous state machines of this sort provide a generally useful capability to implement semaphore interactions.

A semaphore is a binary variable which is tested, and set if appropriate, in a single indivisible cycle. In general, the need for semaphoring arises in a very wide variety of system architecture contexts. Semaphore flags can be a very useful way for independent processes or processors to communicate with each other. Setting and testing semaphore conditions can also be a useful way to communicate across clock boundaries.

Figure 9:
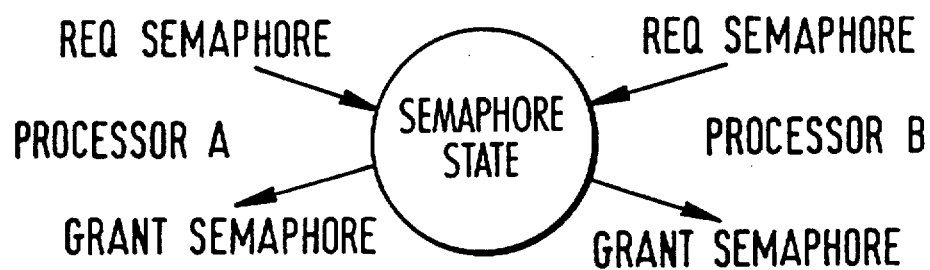
FIG. 9(a) is a state diagram of a semaphore arbiter.
FIG. 9(b) is a schematic diagram of a semaphore arbiter.
FIG. 9(c) shows example waveforms in the arrangement of FIG. 9(b).
Figure 9:
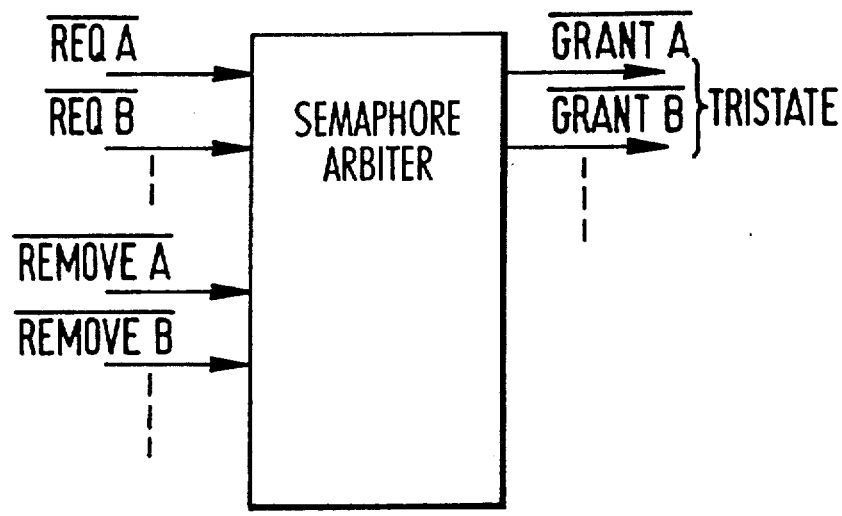
Figure 9:
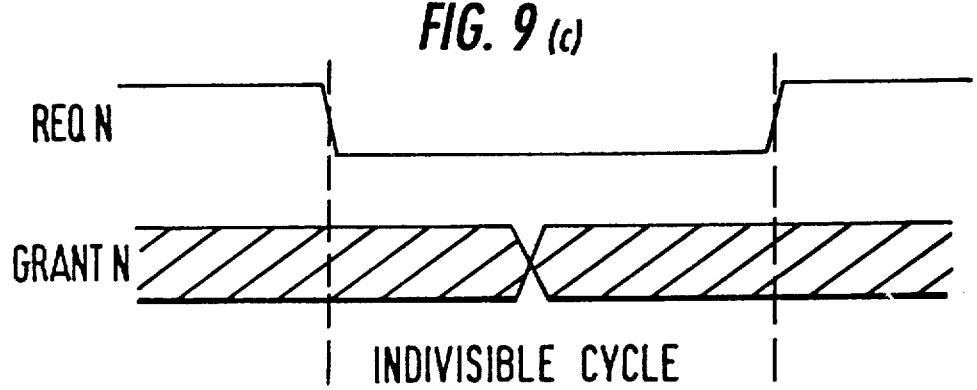

Thus, as seen in FIGS. 9(a) through 9(c), the requests from separate processors may be implemented in state diagram logic, analogous to that of FIG. 7, to implement a semaphore interface as opposed to simply a request for arbitration of a shared resource.

The capability for interface between processors or processes can be used in a wide variety of other contexts. Multi-port memories, as discussed above, are a particularly important class of applications. However, it should be noted that they are only one class of applications. This capability is particularly advantageous for memories which are shared between two or more independent processors. For example, in multi-processor systems generally, a significant part of the system topology is the inter-connection of memory. That is, the connectivity of the processors is not the only relevant factor; the connectivity of the memories is also very important. Many multi-processor analyses assume that all memory will be shared, or that nearly all memory will be local. However, both of these models are limited. Architectures which provide for local priority with some inter-processor sharing of memories are more advantageous for some purposes. In such architectures, the asynchronous arbitration and semaphoring capability provided by the disclosed innovations is particularly advantageous.

For example, in multi processor systems having a large number of processors, it may be useful to share local memories. That is, each processor would have priority on its own portion of memory, but other processors could also access this memory on a lower priority basis. This provides an efficient and high bandwidth way to transfer data locally. Another advantage of this asynchronous arbitration and semaphore capability relates to clock skew in large systems. When a high speed digital system reaches a certain size, the electrical propagation delay across the physical width of the system is likely to be quite significant in relation to the clock period.

In addition, this asynchronous arbitration capability is extremely useful for neural-network or cellular automata systems. In such systems, a great deal of the information lies in the pattern of connection. Thus the ability to dynamically reconfigure connections on the fly is extremely valuable. In particular, there is a problem in neural-network systems with global clock phase. Neural-network systems have been constructed both with and without a global system clock. However, the use of a global system clock presents some difficulty in achieving the desired function of a neural-network. This may be partly because the neural-network architectures are inherently highly distributed, and the use of a global clock may constrain the behaviour of the individual units to a degree which prevents them achieving their full functionality.

Another issue in neural-network architecture is the degree of connectivity available at each site. Many previously proposed systems have used a quite low degree of pathway connectivity. By contrast, the actual architecture of neurons in a human brain will have a connectivity of the order of dozens per site. To implement with such a degree of connectivity electronically is very difficult. However, this natural example does suggest that the attempts to implement full neural- network capability with no more than a few connections per site, as is commonly done, may be a weak compromise. An advantage of the present invention is that it permits a higher degree of connectivity per site to be used in neural-network. Another advantage is that it permits a neural-network to be configured without a global clock.

Another way of regarding key issues in neural-network architecture is that the system should not be too stable. Since the individual units are not directly programmed or supervised, it is desirable not to over-constrain their behaviour. This permits them to acquire significant long term order, as is desired.

Thus, asynchronous arbitration and/or semaphoring, as disclosed herein, may be extremely useful in configuring neural-network architectures. This permits processors to signal each other. This can also be used to share resources, such as local patches of memory.

Another use of the arbitration and semaphoring capability disclosed herein is in pipelined algorithms. Again, the ability to do asynchronous arbitration on the fly can be used to cross clock boundaries. In particular, in a double-buffer memory organisation, where two processors interface by hand-shaking and exchanging access to banks of the memory, the greatly improved arbitration capability herein may be used to provide a more complex time-domain interface between the processors. That is, in addition to the bank swaps used in the double-buffering scheme, it may be possible to permit one processor to "look ahead" at data which has already been written by the other processor to the other bank of memory. This permits processors running pipelined processes to keep their pipelines full.

APPENDIX

```
MODULE patarbabl (pass)
FLAG '-r3'
TITLE 'Asynchronous Arbiter
      Osman Kent - (c) benchMark Technologies Ltd 1988'
aifiden (?pass,pass1)
{
message '----------------------- PASS 1 -----------------------'
     patarb  DEVICE  'P22V10';
}
aifiden (?pass,pass2)
{
message '----------------------- PASS 2 -----------------------'
     patarb  DEVICE  'P22V10';
}
•    INPUTS
•
     apreq         pin 1;      "high for ap request
     iopreq        pin 2;      "high for iop request
     vmereq        pin 3;      "high for vme request
```

```
                refreq          pin 4;          "high for refresh request reset           pin 5;          "low for reset

*   OUTPUTS
        * qapreq          pin 14;         "latched ap request
                qiopreq         pin 15;         "latched iop request
                qvmereq         pin 16;         "latched vme request
                qrefreq         pin 17;         "latched refresh request apgnt           pin 18;         "low grant to ap
                iopgnt          pin 19;         "low grant to iop
                vmegnt          pin 20;         "low grant to vme
                refgnt          pin 21;         "low grant to refresh le              pin 22;         "high for pas. thru latch
                y               pin 23;         "internal state variable apgnt   istype 'neg';
                iopgnt  istype 'neg';
                vmegnt  istype 'neg';
                refgnt  istype 'neg';
                le      istype 'neg';
                y       istype 'neg';

*   STATE ASSIGNMENTS
        * current_state = [le,y,iopgnt,vmegnt,apgnt,refgnt];

s0      = ^b111111;             "idle state
                s1      = ^b011111;             "first latching state
                s2      = ^b001111;
                s3      = ^b001110;             "grants to refresh
                s3p     = ^b101110;             "transient
                s4      = ^b001101;             "grants to ap
                s4p     = ^b101101;             "transient
                s5      = ^b001011;             "grants to vme
                s5p     = ^b101011;             "transient
                s6      = ^b000111;             "grants to iop
                s6p     = ^b100111;             "transient
                s7      = ^b101111;

EQUATIONS

@ifiden (?pass,pass1)
(
        current_state := !reset & s0;   "start from state 0
)

@ifiden (?pass,pass2)
(
@include 'patarb.ps1'
*
*   Latch the incoming requests
*
        qapreq  = reset & apreq & le
                # reset & qapreq & !le
                # reset & qapreq & apreq;

qiopreq = reset & iopreq & le
                # reset & qiopreq & !le
                # reset & qiopreq & iopreq;

qrefreq = reset & refreq & le
                # reset & qrefreq & !le
                # reset & qrefreq & refreq;

qvmereq = reset & vmereq & le
                # reset & qvmereq & !le
                # reset & qvmereq & vmereq;

)

@ifiden (?pass,pass1)
(
STATE_DIAGRAM current_state

STATE s0:       If ((qapreq & apreq)
                        #(qvmereq & vmereq)
```

```
                         #(qiopreq & iopreq)
                         #(qrefreq & refreq)
                         )
                     THEN s1
                     ELSE s0;

STATE s1:        GOTO s2;

STATE s2:        IF (qrefreq)
                     THEN s3
                     ELSE IF (!qrefreq & qapreq)
                         THEN s4
                         ELSE IF (!qrefreq & !qapreq & qvmereq)
                         THEN s5
                         ELSE s6;

STATE s3:        IF (!refreq)
                     THEN s3p
                     ELSE s3;

STATE s3p:       GOTO s7;

STATE s4:        IF (!apreq)
                     THEN s4p
                     ELSE s4;

STATE s4p:       GOTO s7;

STATE s5:        IF (!vmereq)
                     THEN s5p
                     ELSE s5;

STATE s5p:       GOTO s7;

STATE s6:        IF(!iopreq)
                     THEN s6c
                     ELSE s6;

STATE s6p:       GOTO s7;

STATE s7:        GOTO s0;

)

END

ABEL(tm) Version 2.02a  -  Document Generator          23-Mar-88 05:29 AM
Asynchronous Arbiter
    Osman Kent - (c) benchMark Technologies Ltd 1988
Equations for Module patarbabl Device patarb Reduced Equations:

!e = !(apgnt & iopgnt & !!e & refgnt & reset & vmegnt
         # apgnt & iopgnt & !!e & refgnt & reset & vmereq & !y
         # apgnt & iopgnt & !!e & refreq & reset & vmegnt & !y
         # apgnt & iopreq & !!e & refgnt & reset & vmegnt & !y
         # apreq & iopgnt & !!e & refgnt & reset & vmegnt & !y
         # apgnt & apreq & iopgnt & qapreq & refgnt & reset & vmegnt & y
         # apgnt & iopgnt & iopreq & qiopreq & refgnt & reset & vmegnt & y
         # apgnt & iopgnt & qrefreq & refgnt & refreq & reset & vmegnt & y
         # apgnt & iopgnt & qvmereq & refgnt & reset & vmegnt & vmereq & y);

y = !(!apgnt & iopgnt & refgnt & reset & vmegnt & !y
         # apgnt & !iopgnt & refgnt & reset & vmegnt & !y
         # apgnt & iopgnt & !!e & refgnt & reset & vmegnt
         # apgnt & iopgnt & !refgnt & reset & vmegnt & !y
         # apgnt & iopgnt & refgnt & reset & !vmegnt & !y);

iopgnt = !(apgnt & !iopgnt & !!e & refgnt & reset & vmegnt & !y
         # apgnt & !!e & !qapreq & !qrefreq & !qvmereq & refgnt &
           reset & vmegnt & !y);
```

```
vmegnt = !(apgnt & iopgnt & !le & refgnt & reset & !vmegnt & !y
         # apgnt & iopgnt & !le & !qapreq & !qrefreq & qvmereq &
         refgnt & reset & !y);

apgnt = !(!apgnt & iopgnt & !le & refgnt & reset & vmegnt & !y
        # iopgnt & !le & qapreq & !qrefreq & refgnt & reset &
        vmegnt & !y);

refgnt = !(apgnt & iopgnt & !le & qrefreq & reset & vmegnt & !y
         # apgnt & iopgnt & !le & !refgnt & reset & vmegnt & !y);

qapreq = (apreq & le & reset # !le & qapreq & reset);

qiopreq = (iopreq & le & reset # !le & qiopreq & reset);

qrefreq = (!le & qrefreq & reset # le & refreq & reset);

qvmereq = (!le & qvmereq & reset # le & reset & vmereq);
```

I claim:

1. An arbitration system comprising:
   a resource;
   a plurality of operating means connected to said resource, each of said operating means having an output for providing a respective one of a plurality of first resource request signals to request and maintain access to said resource and having an input for receiving a respective one of a plurality of grant signals, each of said operating means accessing said resource in response to receiving the respective grant signal for said each operating means;
   latch means having a plurality of signal inputs, a corresponding plurality of signal outputs, and a control input, each of said signal inputs receiving a respective one of said first resource request signals, said control input receiving a control signal, and each of said signal outputs providing a respective one of a plurality of second resource request signals;
   said latch means for providing said first resource request signals received by said signal inputs to said signal outputs as said second resource request signals and for latching said second resource request signals in response to said control signal; and
   an asynchronous state machine having a plurality of inputs each receiving a respective one of said first and second resource request signals, a plurality of outputs for providing said grant signals to said plurality of said operating means, and a control output providing said control signal to said latch means, said state machine further comprising:
   first means for providing said control signal to receive said second resource request signals from said latch means,
   second means for providing said control signal in response to receiving at least one of said first and second resource request signals to latch said second resource request signals in said latch means,
   third means for arbitrating among said second resource request signals received from said latch means to select one of said operating means,
   fourth means for providing the respective one of said grant signals for said selected operating means, and
   fifth means for providing said control signal to enable said latch means to receive said first resource request signals and to provide said second resource request signals when the respective one of said first resource request signals for said selected operating means ceases to request said resource.

2. A system as claimed in claim 1, wherein said state machine operates cyclicly based on a plurality of states, said states including an initial state, a decision state, and a plurality of grant states, each of said grant states corresponding to a respective one of said operating means, and further wherein:
   said first means provides said control signal and said fifth means provides said control signal in said initial state;
   said second means provides said control signal and said third means selects one of said operating means in said decision state; and
   said fourth means provides the respective one of said grant signals for the selected operating means in said grant state corresponding to said selected operating means.

3. A system as claimed in claim 2, wherein said plurality of states further comprises a transient state, and further wherein said state machine changes from said grant state corresponding to said selected operating means to said initial state via said transient state.

4. A system as claimed in claim 2, wherein a single programmable logic array comprises said state machine and said latch means.

5. A system as claimed in claim 2, wherein said state machine has a state variable comprising a plurality of bits, each bit having one of two values, said state variable having different values in each of said plurality of states, and further wherein said state machine changes the value of only one of said bits when said state machine changes from one of said states to another one of said states.

6. A system as claimed in claim 5, wherein said state machine provides each one of said grant signals based on the value of a respective one of said bits of said state variable.

7. A system as claimed in any one of claims 1 to 6, wherein said resource is a bus.

8. A system as claimed in any one of claims 1 to 6, wherein said resource is a memory.

9. A system as claimed in claim 8, wherein said memory is a dRAM.